US008658080B2

(12) United States Patent
Brunner et al.

(10) Patent No.: US 8,658,080 B2
(45) Date of Patent: Feb. 25, 2014

(54) METHOD FOR BLOW MOLDING CONTAINERS

(75) Inventors: Andreas Brunner, Aufhausen (DE); Erik Blochmann, Neutraubling (DE); Florian Geltinger, Neufahrn (DE)

(73) Assignee: Krones AG, Neutraubling (DE)

( * ) Notice: Subject to any disclaimer, the term of this patent is extended or adjusted under 35 U.S.C. 154(b) by 427 days.

(21) Appl. No.: 12/876,363

(22) Filed: Sep. 7, 2010

(65) Prior Publication Data

US 2011/0057343 A1 Mar. 10, 2011

(30) Foreign Application Priority Data

Sep. 10, 2009 (DE) .......................... 10 2009 041 013

(51) Int. Cl.
*B29C 49/18* (2006.01)
*B29C 49/16* (2006.01)
*B29C 49/78* (2006.01)

(52) U.S. Cl.
USPC ........................... 264/529; 264/40.3; 425/522

(58) Field of Classification Search
None
See application file for complete search history.

(56) References Cited

U.S. PATENT DOCUMENTS

| | | | | | |
|---|---|---|---|---|---|
| 4,394,333 | A | * | 7/1983 | Fukushima et al. | 264/37.15 |
| 4,439,126 | A | * | 3/1984 | Fukushima et al. | 425/135 |
| 4,488,863 | A | * | 12/1984 | Collette | 425/530 |
| 7,892,477 | B2 | * | 2/2011 | Hirdina | 264/529 |
| 8,262,384 | B2 | * | 9/2012 | Blochmann | 425/535 |
| 8,287,798 | B2 | * | 10/2012 | Jover et al. | 264/529 |
| 2004/0173949 | A1 | * | 9/2004 | Storione et al. | 264/529 |
| 2008/0164642 | A1 | | 7/2008 | Hirdina | |
| 2008/0191394 | A1 | * | 8/2008 | Elliott | 264/529 |
| 2010/0090375 | A1 | * | 4/2010 | Geltinger et al. | 264/529 |
| 2010/0171243 | A1 | * | 7/2010 | Zoppas et al. | 264/529 |
| 2010/0176526 | A1 | | 7/2010 | Jover et al. | |
| 2010/0285169 | A1 | * | 11/2010 | Blochmann | 425/535 |
| 2011/0089613 | A1 | * | 4/2011 | Hirdina | 264/520 |
| 2011/0089614 | A1 | * | 4/2011 | Hirdina | 264/529 |
| 2012/0007290 | A1 | * | 1/2012 | Hoellriegl et al. | 264/532 |

FOREIGN PATENT DOCUMENTS

| | | |
|---|---|---|
| CN | 101014458 A | 8/2007 |
| DE | 102004014653 A1 | 10/2005 |
| DE | 102007015105 A1 | 10/2008 |
| DE | 102008061492 A1 | 6/2010 |
| EP | 1922206 A1 | 5/2008 |
| EP | 1974892 A2 | 10/2008 |
| GB | 2431372 A | 4/2007 |
| WO | WO-2009004472 A2 | 1/2009 |

OTHER PUBLICATIONS

Search Report for DE 10 2009 041 013.9 dated Sep. 5, 2011.
Notification of First Office Action, The State Intellectual Property Office of P.R. China, Application No. 201010282491.5, dated Feb. 16, 2013.
Notification of Second Office Action, The State Intellectual Property Office of P.R. China, Application No. 201010282491.5, dated May 16, 2013.

\* cited by examiner

*Primary Examiner* — Benjamin Schiffman
(74) *Attorney, Agent, or Firm* — Marshall, Gerstein & Borun LLP

(57) ABSTRACT

A method for blow molding containers in blow molds of a device operated with the recovery of air from the blow molds, where operation is accomplished consecutively in a preblow stage with a low pressure and at least two further blow stages with respective higher pressures, and where subsequently, in a recovery phase with several pressure stages, air is fed from the respective blow mold, air from the blow mold is first fed into the volumes allocated to the preblow stage, with priority over a feeding at least into the volume allocated to the pressure stage following the preblow stage. Further, a blow control and a control means for the pressure in the volume, where the blow control has a program section for primarily feeding air first into the volume, and possibly for limiting the pressure in the volume to a multiple of the pressure.

5 Claims, 3 Drawing Sheets

METHOD FOR BLOW MOLDING CONTAINERS

CROSS-REFERENCE TO RELATED APPLICATION

The present application claims the benefit of priority of German Application No. 102009041013.9, filed Sep. 10, 2009. The entire text of the priority application is incorporated herein by reference in its entirety.

FIELD OF THE DISCLOSURE

The disclosure relates to a method as well as to a device for blow molding containers, such as for beverage bottling operations.

BACKGROUND

In the method known from DE 10 2004 014 653 A, in the recovery phase, air from the respective blow mold is first fed into a volume allocated to a blow stage higher than the preblow stage, and only subsequently, the volume allocated to the preblow stage is fed from this volume, the pressure being controlled to the pressure for the preblow stage. The higher blow stage following the preblow stage ranges up to a relatively high pressure of about 30 bar, while the highest blow stage ranges up to a very high pressure of about 40 bar. The air from the respective blow mold is only fed into the volume in the highest pressure stage of the recovery phase up to a pressure approximately corresponding to the pressure of the blow stage following the preblow stage, while an operating air storage is fed in the next pressure stage of the recovery phase. Apart from the fact that the high pressure of the highest blow stage requires an undesired high energy demand, the pressure usable for the preblow stage which is secondarily fed is inappropriately low. As during the blowing process, pressure variations inevitably occur in the volume allocated to the preblow stage due to the feeds and the preblow stages, and as the pressure potential in the volume allocated to the preblow stage is low, there are extremely undesired fluctuations in the preblow stage. The preblow stage already definitely determines the material distribution in the preform, possibly depending on the temperature profile, which hardly changes any more in the following blow stages. The mentioned fluctuations then result in an unsatisfactory constancy of the volumes of the blow-molded containers and/or in non-uniform individual segment weights of the containers. With an only low pressure potential in the volume allocated to the preblow stage, the air flow can furthermore become subcritical during the preblow stage. Thus, the preblow stage volume flow rate cannot be adjusted to be exactly reproducible due to the pressure variations in the volume allocated to the preblow stage arising by the feeds during the recovery phase. As a result, a constant quality of the blow-molded containers cannot be ensured due to the fluctuations occurring in the preblow stage.

In a method known from EP 1 9 22 206 A, in the recovery phase, a volume common to several consumers is first primarily fed by building up a relatively low pressure of about 17 bar therein, and the volume allocated to the preblow stage is only fed secondarily, in which compulsorily only a very low pressure potential for the preblow stage is formed, resulting in the above-mentioned disadvantages. In this known method, too, the blow stage following the preblow stage is carried out up to a relatively high pressure of about 18 bar, while in the highest blow stage, operation is effected with a pressure of up to 40 bar requiring an extremely high energy demand.

In a method known from DE 10 2007 015 105 A with a pressure build-up in the manner of a cascade, the lowest pressure stage in the relief of the blow mold is used for the pressure build-up in the volume for the preblow stage in the recovery phase, which can lead to a relatively low pressure potential in the volume allocated to the preblow stage involving the above-mentioned disadvantages. If the preblow stage is embodied as first pressure build-up step of the final blow stage, the preblow stage is integrated in the cascade-like pressure build-up of the final blow stage. Concretely, the preblow pressure is built up from an individual storage, and in the process, the proportion of the compressed gas from the blow mold originating from the lowest relief stage is used for filling up the preblow pressure. If, however, the preblow stage is embodied, as the final blow stage, with several pressure build-up steps each from several separate storages, the lowest pressure relief steps of the final blow stage are used for the pressure build up of the preblow stage.

SUMMARY OF THE DISCLOSURE

As aspect underlying the disclosure is to provide a method and a device of the type mentioned in the beginning by means of which a constant high quality of the blow-molded containers, in particular plastic bottles, can be assured.

By feeding the volume for the preblow stage first, and before a volume for a higher blow stage, or in any case chronologically before a volume of an even higher blow stage, the probability of pressure variations during preblowing is extremely low or does no longer exist, thus ensuring a high constancy of the volumes of the blow-molded containers and of the individual segment weights of the containers.

In a preferred method variant, in the recovery phase, the volume for the preblow stage is fed chronologically before a volume of a higher blow stage is fed. At the beginning of the feed of the volume for a higher blow stage, the feed of the volume for the preblow stage can further continue or be accomplished simultaneously over a certain period.

If according to the method, the volume allocated to the preblow stage is fed in the recovery phase, and there only in at least one relatively high pressure stage, primarily with air from the blow mold before or after at least one further volume is fed, a favorable pressure potential can be created in the volume allocated to the preblow stage, e.g. a relatively high pressure compared to the pressure built up in the blow mold or the preform, respectively, during the preblow stage, so that the inevitable pressure variations in the volume allocated to the preblow stage can no longer have an effect in the preblow stage, or at most have a clearly reduced effect. Thanks to the high pressure potential or high pressure, respectively, a relatively small throttle valve can be used by means of which operation is performed in the preblow stage, so that the preblow stage pressure and the preblow amount are exactly reproducible and above all remain largely constant for all preblow stages. As a result, a constant quality of the blow-molded containers is ensured by equal preblow stages. Equally, the volume for the blow stage following the preblow stage can be primarily fed to a volume for an even higher blow stage to further shape the preform with high constancy.

According to definition, air from the blow mold means air that originates from the container located in the blow mold.

With the trick of skipping the pressure stage, which is so to speak used for feeding a further volume of a higher blow stage, in the recovery phase towards the higher one by primarily feeding air from the blow mold into the volume allocated to the preblow stage, one then works in the preblow stage in the device under constant conditions largely independent of pressure variations to achieve a constantly high final quality. In cooperation with the pressure control device, the program section of the blow control always provides a sufficiently high pressure potential in the volume allocated to the preblow stage, which ensures a constant quality level in all preblow stages. If the program section of the blow control only secondarily controls the air feed into a further volume, e.g. for at least one further higher blow stage, this does not have any influence on the pressure potential in the volume allocated to the preblow stage. As the pressure potential in the volume allocated to the preblow stage or the pressure level there is sufficiently high thanks to the priority feed, in the preblow stage, one does not have to work with an inappropriately large throttle valve but can choose an optimally small throttle valve for the preblow stage pressure and the preblow stage air quantity, so that the probability of a subcritical flow becomes very low or is even eliminated.

In an appropriate method variant, air from the respective blow mold is fed into the volume allocated to the preblow stage at the highest low pressure at least during the recovery phase pressure stage, before air is also fed into at least one further volume. If several blow stages and several relief pressure stages are employed, air is preferably alternatively fed into the volume for the preblow stage during the recovery phase pressure stage at the next lower pressure. Preferably, the feed is not necessarily performed over the complete period of a relief pressure stage, but it is chronologically defined such that the desired high pressure potential is reliably achieved in the volume allocated to the preblow stage.

Air feed into the volume allocated to the preblow stage is appropriately restricted in time while the pressure building up thereby is monitored, preferably up to a pressure value approximately corresponding to 2 to 5 or 3 to 5 times the preblow stage pressure.

In another appropriate method variant, with the priority feed into the volume allocated to the preblow stage, a pressure is built up there which has a relation to the preblow stage pressure excluding a subcritical flow into the blow mold during the preblow stage. In this manner, a subcritical flow in the preblow stage is positively prevented, where otherwise variations in pressure in the volume allocated to the preblow stage could have effects in the blow mold.

In a further appropriate method variant, a pressure is employed in the blow stage following the preblow stage, which is an intermediate stage, which pressure only amounts to 1.5 to 3 times, preferably approximately 2 times the preblow stage pressure. In this intermediate blow stage, which is only carried out up to a relatively low pressure, energy is saved, and the preform which has optionally been inflated somewhat in the preblow stage and mechanically stretched in the process, is relatively quickly brought to the size of the container, however without already developing its details. This offers the advantage that the subsequent, higher blow stage can be performed only up to a relatively low maximum pressure to neatly shape and stabilize the container. A relatively low maximum pressure, however, saves a considerable amount of energy in the blow process.

Appropriately, the pressure in the blow stage is restricted to a maximum pressure of about 10 bar to 35 bar, preferably 28 bar to 35 bar, which results in a considerable saving of energy in view of maximum pressures of up to 40 bar common in prior art.

According to the method, air from the respective blow mold can be secondarily fed into the volume allocated to the intermediate blow stage during at least one recovery phase pressure stage which is operated at a lower pressure than the pressure stage during which the volume allocated to the preblow stage was primarily fed.

In a blow molding process with three blow stages at differently high pressures and correspondingly many relief pressure stages, the volume allocated to the preblow stage is fed at the highest one of the low pressures only during the recovery phase pressure stage. The pressure stage or pressure stages at the lower one of the low pressures can be utilized for feeding other volumes or other consumers, e.g. the factory's compressed-air ductwork system.

In a blow molding process with four or more blow stages at differently high pressures, the volume allocated to the preblow stage can be primarily fed during one of the highest recovery phase pressure stages, and secondarily, the next lower pressure stages are used for feeding other volumes or other consumers. The highest pressure stage can be used for feeding the volume e.g. of the second blow stage, the next lower one for feeding the volume of the preblow stage, and only the then next lower one(s) for feeding a volume or the volumes of higher blow stages.

In the device, a throttle valve can be arranged upstream or downstream of the switching valve or in the switching valve. The switching valve is preferably a 2/2-way valve with cam or magnet operation via the blow control.

The throttle valve is preferably an adjustable throttle valve to be able to individually adjust the process flow in the preblow stage to the respective demand. The throttle valve is either arranged in a one-way restrictor that shuts in the direction of the flow to the blow mold, or it is bypassed by a check valve that shuts towards the blow mold and clears an at least essentially unrestricted and large cross-section in the direction of the flow to the volume allocated to the preblow stage. Thereby, the throttle valve required for the preblow stage does not have any influence on the priority feeding of air from the respective blow mold into the volume allocated to the preblow stage, so that for building up the required high pressure potential, throttle losses are avoided and a relatively short period is sufficient in each case.

To avoid long flow paths to the blow molds and flow influences conditioned thereby, it is appropriate for the volumes to be arranged in a device part rotating during the blow molding process. Preferably, the volumes have the shape of ring channels to which the blow molds of the device can be easily connected. Up to 50 blow molds or more can be used in the device.

To already achieve optimum conditions at least in the preblow stage also at the start of the device, it can be appropriate to arrange a pressure control valve between the main supply with compressed air and the volume allocated to the preblow stage which is adjusted to approximately the same pressure as the pressure that can be generated by the priority feed of air from the respective blow mold. This pressure can amount to a multiple of the preblow stage pressure, however, it normally only has to be built up in the start phase of the device, as the device can be operated, at least in the preblow stages and possibly at least in the next higher blow stages, independently of the main supply thanks to the air recovery from the stagewise relief of the blow mold.

BRIEF DESCRIPTION OF THE DRAWINGS

With reference to the drawings, embodiments of the subject matter of the disclosure are illustrated. In the drawings.

DETAILED DESCRIPTION OF THE PREFERRED EMBODIMENT

Figure 1:
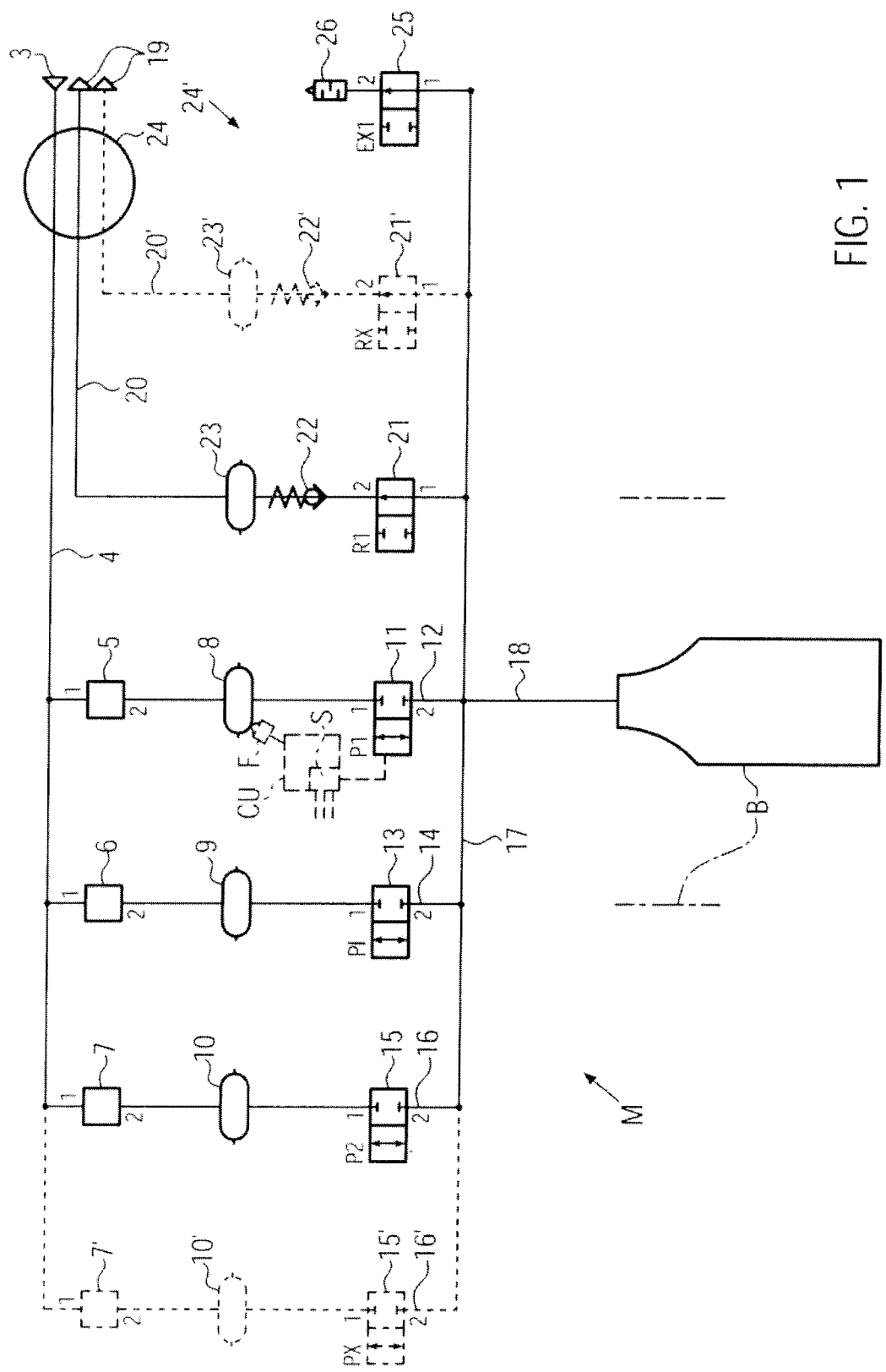
FIG. 1 shows a schematic block diagram of an embodiment of a device for blow molding containers, in particular plastic bottles, from tempered preforms, where a second embodiment is indicated in a dashed line.

In FIG. 1, a first embodiment of a device M (a blow molding machine) shown in solid lines comprises a main supply 3, e.g. a compressor or a compressed-air storage which is connected to a distribution 4 in a rotating device part 24' via a rotary transmission leadthrough 24. From the distribution 4, several parallel conduits branch off via pressure control valves 5, 6, 7 to volumes 8, 9 10 allocated to several blow stages. The volumes 8, 9, 10 are appropriately provided in the form of ring channels in the rotating device part 24' and are connected each separately to a further distribution 17, e.g. a part of a distributor block at each station (not shown), via switching valves (2/2-way switching valves with mechanical operation, such as cam operation or magnet operation Z), to which distribution one blow mold B each of several blow molds provided in the device M is connected via a conduit 18. Up to 36 or more blow molds B can be employed.

The pressure control valve 5, the volume 8 and the switching valve 11 are, for example, allocated to a preblow stage which operates at a pressure of P1 or less. The pressure control valve 6, the volume 9 and the switching valve 13 are allocated to a further blow stage, here an intermediate blow stage, up to a pressure P1. The pressure control valve 7, the volume 10 and the switching valve 15 are finally allocated to a further blow stage at a pressure P2 higher than the pressure P1 and the pressure P1. At least in the switching valve 11, a throttle valve 12 is provided which can be arranged upstream or downstream of the switching valve 11 or in the same. The throttle valve 12 for the preblow stage is either arranged in a one-way restrictor 12' or it can be bypassed by a check valve 12' which shuts in the direction of the flow to the blow mold B and clears an essentially unrestricted and large cross-section in the direction of the flow to the volume 8. Optionally, throttle valves 14, 16 could also be provided in the switching valves 13, 15.

A programmable or programmed electronic blow control CU acts as control for the blowing process and at least the switching valves 11, 13, 15. The blow control CU e.g. contains a program section S which, in the blow process in a recovery phase, feeds air from the respective blow mold B primarily or first into the volume 8 allocated to the preblow stage via the switching valve 11 and the check valve 12', before e.g. air is also secondarily fed from the blow mold B via the distribution 17 and the switching valve 13 into the volume 9. A pressure control means F, e.g. a pressure sensor or pressure gauge, is provided at least for the volume 8, and is in signal-transmitting connection with the blow control CU and controls the pressure or the pressure potential in the volume 8, so that the blow control CU can exactly adjust the period until the desired pressure potential or pressure is achieved in the volume 8 in the recovery phase of the blow mold B depending on the pressure, during which period the switching valve 11 is adjusted to be open.

Furthermore, a conduit 20 to a consumer 19 is connected to the distribution 17 which is, for example, a stretching device for the respective blow mold B or the compressed-air ductwork system of the factory from which, for example, the compressor of the main supply 3 can be fed. In the conduit 20, a switching valve 21, a check valve 22 allocated to the same and shutting in the direction of the flow to the distribution 17, and a further volume 23 are arranged. Furthermore, a switching valve 25 is connected to the distribution 17 with an exhaust air silencer 26 into the atmosphere.

Figure 2:
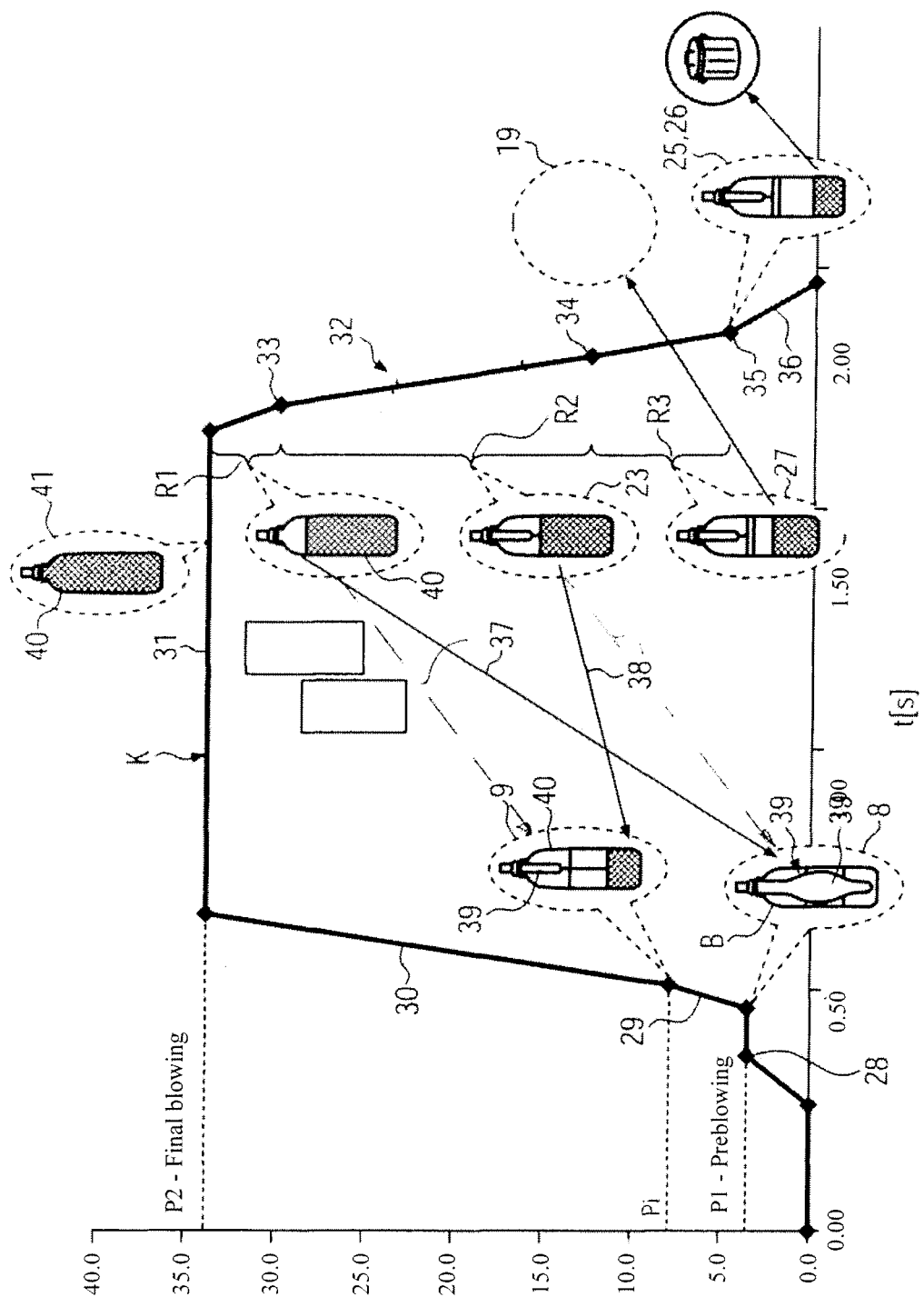
FIG. 2 shows a process diagram with additional explaining illustrations as regards a blow molding process in the first embodiment of the device shown in FIG. 1.

In the embodiment of the device M up to here illustrated with reference to FIG. 1, the blow process shown in FIG. 2 is for example performed and controlled in the blow mold B by means of the switching valves 11, 13, 15, 21 and 25 with three blow stages (preblow stage 28, intermediate blow stage 29 and highest blow stage 30) as well as a recovery phase 32 in several pressure stages R1, R2, R3. At 36, air is blown off into the atmosphere.

Figure 3:
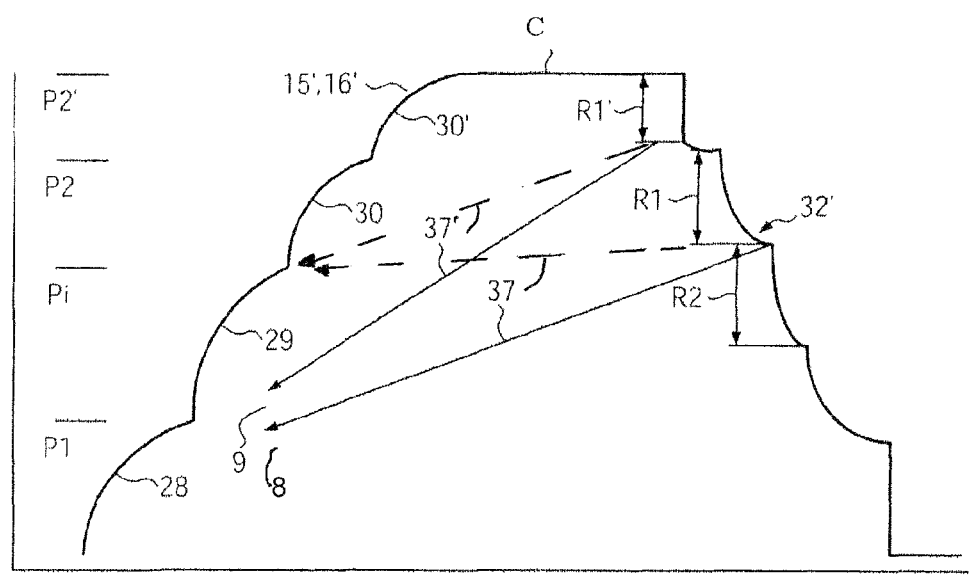
FIG. 3 shows a schematic process diagram of a blow molding process which is performed in the second embodiment of the device indicated in FIG. 1 in a dashed line.

In FIG. 1, a second embodiment of the device M is furthermore indicated in dashed lines by means of which the blow process shown in FIG. 3 can be carried out with four (or more) blow stages (preblow stage 28, intermediate blow stage 29, higher blow stage 30, final blow stage 30', each with differently high pressures P1, P1, P2, P2'), and a recovery phase 32 with, for example, altogether five pressure stages R1', R1, R2, etc. at differently low pressures. In the second embodiment, a further switching valve 15' (optionally with a throttle valve 16'), an allocated volume 10' and a pressure control valve 7' for the highest blow stage 30' are provided in FIG. 3. Another conduit 20' branches off from the distribution 17 to the consumer 19 in which a switching valve 21', a check valve 22', and a further volume 23' are provided.

The process diagram in FIG. 2 shows in a curve C the march of pressure in the blow mold B over time. The preblow stage 28 is controlled by switching over the switching valve 11 in FIG. 1 from the shown shut-off position to the passage position, extends over a predetermined period, and ends with a constantly maintained preblow stage pressure P1. Then, the switching valve 11 is brought to the shut-off position again. In the preblow stage, a preform P introduced into the blow mold B and comprising a certain temperature profile is slightly inflated and preferably mechanically stretched in the axial direction by a stretching rod 39. The preform P has not yet completely, or not at all, reached the inner wall of the blow mold B after the preblow stage 28.

The intermediate blow stage 29 is started with air from the volume 9 by switching the switching valve 13 over from the shown shut-off position to the passage position. In the intermediate blow stage 29, the preform P is largely brought to the size of a container 40 to be formed over a predetermined period up to the pressure Pi, without developing final details. As soon as the pressure Pi in the blow mold B is reached, the switching valve 13 is brought into the shown shut-off position. The subsequent blow stage 30 is started by switching the switching valve 15 over from the shown shut-off position to the passage position of FIG. 1 and carried out over a predetermined period by the blow control CU, until the pressure 92 (final blowing) is reached. The pressure P2 is then maintained along a curve portion 31, where it should be pointed out that the pressure here can be relatively low and amount to 30 bar or less. At the end of the curve portion 31 (after a predetermined period of the blow stage 30), the switching valve 15 is again adjusted to the shown shut-off position. The container 40 is finished.

Now, a recovery phase 32 with several pressure stages R1, R2, R3 follows for this blow mold B, until finally a depressurized state is reached at 36. In the pressure stage R1, air from the blow mold B or the container 40 is fed via the opening check valve 12' into the volume 8 allocated to the preblow stage by switching over first the switching valve 11 from the shown shut-off position of FIG. 1 to the passage position, for example, until a pressure of about 16 bar to 22 bar has built up there. In FIG. 2, this is done during pressure stage R1 to a pressure 33, here, for example, of about 30 bar, as is indicated by the arrow 37. Then, the switching valve 11 is again adjusted to the shut-off position shown in FIG. 1. Only then, the switching valve 13 is adjusted from the shut-off position shown in FIG. 1 to the passage position, and during the next lower pressure stage R2, air from the blow mold B is fed to the volume 9 up to a pressure 34 of about 13 bar here, as is indicated by the arrow 38. As the arrows 37, 38 show, here, the intermediate blow stage 29 is so to speak "skipped" during feeding the volume 8, i.e. feed is effected in a way different to that in prior art, where feed is always accomplished into the next lower stage.

The feed of air from the blow mold B into the volume 8 or the volume 9 does not necessarily have to be performed over the complete period of the respective pressure stage R1, R2, but it is appropriately restricted in time such that in the respective volume 8, 9 a predetermined optimal pressure is just being built up. In the next lower pressure stage R3, air from the blow mold is, for example, fed to the further volume 23 for the further consumer 19 via the switching valve 21 up to a pressure 35 of about 5 bar here. Last, at 36 residual air from the blow mold B is finally discharged into the atmosphere by actuating the switching valve 25 via the exhaust air silencer 26. Along the curve portion 31, the container 40 is finally developed and, as indicated at 41, stabilized.

In the preblow stage 28, the final distribution of the segment weights or the material in the preform P for the final development 41 of the container 40 is already largely produced, optionally supplemented in the intermediate blow stage 29. In the blow processes in the further blow molds B, the same operation is followed in a time-staggered manner, so that the volume 8 is fed cyclically. Although pressure variations inevitably occur in the volume 8, among other things due to the cyclic air feeds, a sufficiently high pressure potential is created there by the priority feed of air into the volume 8, by means of which very constant preblow stage conditions with respect to the pressure P1 and the respective amount of preblow air can be achieved for each preblow stage via the throttle valve which can be embodied to be relatively small, as thanks to the high pressure potential in the volume 8, the inevitable fluctuations cannot have any effect in the blow mold B via the small throttle valve 12, and the probability of a subcritical flow is very low to non-existent.

In the blow process shown in FIG. 3, the curve C also results from the components of the second embodiment shown in a dashed line in FIG. 1. Here, operation is performed with at least four blow stages up to a pressure P2' e.g. of only about 35 bar, and the recovery phase 32' is controlled in e.g. five pressure stages. As indicated by the arrows 37 or 37', air from the blow mold B is fed into the volume 8 which is allocated to the preblow stage either during the highest pressure stage R1' or the next lower pressure stage R1 to produce the aforementioned high pressure potential or a sufficiently high pressure in the volume 8 by means of which largely constant preblow stage conditions can be achieved. Optionally, corresponding to the arrow 37', first the volume 9, and only then (arrow 37) the volume 8 is fed. In each case, the volume 8 is fed before a volume for an even higher blow stage, e.g. 30', is fed. The highest blow stage 30' is controlled by adjusting the switching valve 15' in FIG. 1 from the shown shut-off position to the passage position. The first and second pressure stages R1', R1 of the recovery phase 32' are controlled e.g. by actuating the switching valve 11 and/or 13, while the next lower pressure stage R2 can be controlled e.g. by actuating the switching valve 15. The further pressure stages and the blowing off at 36 can be either controlled by actuating the switching valve 15' or the switching valve 21 or 21', respectively.

The pressure control valves 5, 6, 7, 7' are adjusted to the pressures required in each case in the volumes 8, 9, 10, 10' for the blow process. For example, the pressure control valve 5 for the volume 8 for the preblow stage 28 is adjusted to a pressure around about 20 bar, corresponding to the pressure built up by the priority feed of air from the blow mold B into the volume 8. For starting the device M, for all volumes 8, 9, 10, 10', the main supply 3 is employed.

The disclosure is to also comprise feeding the volume 8 for the preblow stage primarily for feeding a volume for at least one higher blow stage, i.e. to employ not at all the lowest usable pressure stage of the recovery phase for feeding the volume 8, but to always skip at least the feed of the volume of a higher blow stage. This can mean that e.g. the volume 8 or the volume 9 are fed first, the volume 10, however, only after the volume 8.

The invention claimed is:

1. Method for blow molding containers in blow molds of a device operated with a recovery of blow air from blow molds, comprising:
    accomplishing the operation consecutively in a preblow stage with a low pressure and at least two further blow stages with respective higher pressures; and
    subsequently, in a recovery phase, feeding air from a blow mold into separate volumes each common to all blow molds in consecutive pressure stages at respective differently low pressures, and in the recovery phase, chronologically first, feeding air from the blow mold into at least one volume which is allocated to a low blow stage, and subsequently, feeding air into a volume which is allocated to a higher blow stage;
    wherein feeding air in the recovery phase includes first feeding air from the blow mold during a recovery phase pressure stage at a highest low pressure into a volume allocated to the preblow stage, primarily with respect to a subsequent feed into at least one volume allocated to a pressure stage following the preblow stage; and
    wherein restricting in time an air feed into the volume allocated to the preblow stage while monitoring a pressure arising in the volume to a pressure at least twice as high as the low pressure of the preblow stage.

2. Method according to claim 1, and wherein by priority air feed into the volume allocated to the preblow stage, building up a pressure in the preblow stage which is in a relation to the low pressure which at least largely excludes a critical flow into the blow mold during the preblow stage.

3. Method according to claim 1, and feeding the volume allocated to the intermediate blow stage during at least one recovery phase pressure stage which leads to a next lower pressure than a biased pressure recovery stage, during which the volume allocated to the preblow stage was fed.

4. Method according to claim 1, wherein the monitoring of the pressure arising in the volume is monitored up to a pressure valve corresponding to approximately 2 to 5 times the low pressure.

5. Method according to claim 4, wherein the monitored pressure valve is monitored up to a pressure valve corresponding to approximately 3 to 5 times the low pressure.

* * * * *